Feb. 16, 1960 R. L. JAROS 2,925,235
LIQUID DISPENSING BOTTLE STAND
Filed March 21, 1957
FIG. 1.
FIG. 2.
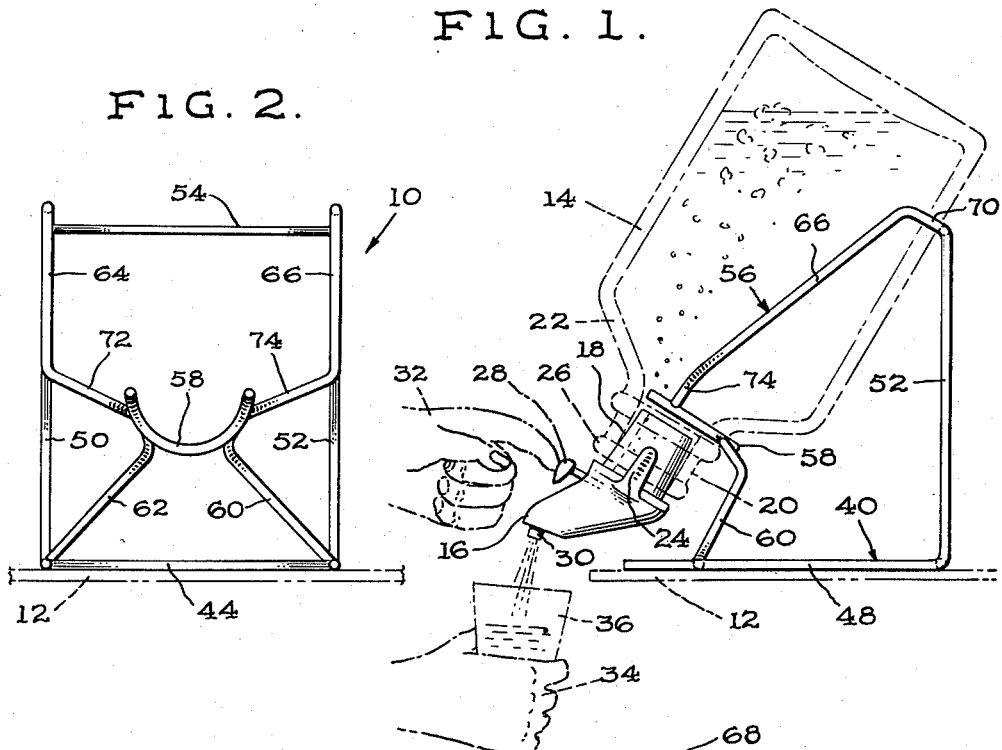
FIG. 3.
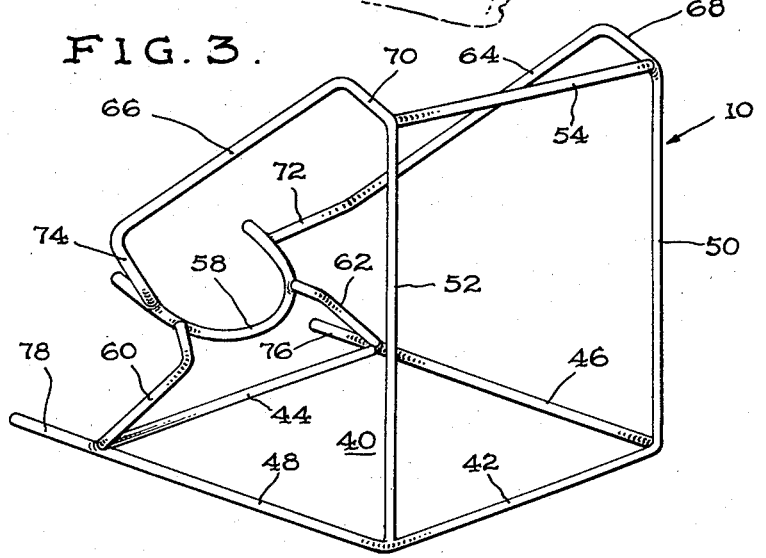
INVENTOR
ROBERT L. JAROS
BY Gustave Miller
ATTORNEY

United States Patent Office 2,925,235
Patented Feb. 16, 1960

2,925,235

LIQUID DISPENSING BOTTLE STAND

Robert L. Jaros, Watertown, Mass., assignor to Gustave Miller, Washington, D.C.

Application March 21, 1957, Serial No. 647,676

1 Claim. (Cl. 248—153)

This invention relates to a liquid dispensing bottle stand and has for an object to provide an improved stand for supporting a bottle in inverted inclined position, so that the bottle may be supported in dispensing position at any convenient location, and particularly in a home refrigerator so that the contents of the bottle may be dispensed without the necessity of handling the bottle or of removing it from the refrigerator.

A particular purpose of this invention is to provide a liquid dispensing bottle stand particularly intended for use in connection with gallon or half gallon milk or beverage bottles so that the bottle may be supported in a refrigerator in dispensing position. Nowadays, milk and other beverages are being sold in stores and delivered at the home in gallon and half gallon jugs, thus providing economy of distribution, yet such bottles in such sizes are rather awkward for the average housewife to handle, particularly when it is necessary to remove the full bottle from the refrigerator to pour a drink therefrom and then replace it in the refrigerator. With this invention, it is possible to dispense a drink from the bottle without the necessity of removing the bottle from the refrigerator, and in this invention, the dispensing stand will preferably be made of wire of suitable strength so that it is comparatively inexpensive and can be made at such a low cost that it can be either sold at a low cost or even given away by milk or beverage companies as an inducement for buying the milk or beverage in gallon or half gallon size bottles rather than in the conventional quart or pint size bottles.

A further object of this invention is to provide an inexpensive wire stand which will support a dispensing bottle in inclined position on the shelf of the refrigerator so that with a suitable tap or faucet placed within the bottle neck, the bottle then becomes a home milk or beverage bar from which the milk or other beverage can be readily drawn without removing the bottle from the refrigerator.

With the foregoing and other objects in view, this invention comprises the combination, construction and arrangement of parts hereinafter set forth, claimed and disclosed in the accompanying drawings, wherein:

Fig. 1 is a side elevation of the stand of this invention showing a beverage bottle and a dispensing tap as supported on a refrigerator shelf.

Fig. 2 is a front elevational view of the stand of this invention.

Fig. 3 is a perspective rear and side view.

There is shown at 10 the bottle supporting stand of this invention which may rest on any suitable supporting surface such as a refrigerator shelf 12 for supporting a gallon or a half gallon bottle 14 having a beverage dispensing tap 16 of such construction that it may be readily washed and sterilized.

The dispensing tap 16, made of suitable metal such as aluminum, or of suitable plastic, is provided with a tapered shank 18 to fit within the neck 20 of the bottle 14, the neck 20 being of substantially smaller diameter than the diameter of the bottle 14 and connected thereto by a shoulder 22. To help insure that the tap remains within the neck 20, the tap 16 may be provided with opposed spring fingers 24 which will yieldably embrace the lip 26 of the bottle neck 20. A valve handle 28 is provided for manual operation for causing the beverage to flow through the spout 30 of the tap 16, and may be operated by one hand 32 of the user while the user's other hand 34 holds a drinking glass 36 in beverage receiving position.

The stand 10 is made of integrally connected wires so as to be strong yet inexpensive. The stand 10 includes a rectangular foot portion 40 consisting of a rear wire 42, a parallel front wire 44 and two opposite parallel side wires 46 and 48. Extending upwardly from the intersection of the rear wire 42 with the side wires 46 and 48 are upright wires 50 and 52 joined at their top by a cross wire 54 thus providing an inverted squared U. Inclined downwardly from the top of the upright wires 52 to the intersection of the front wire 44 with the side wires 46 and 48 of the rectangular foot member 40 is a bottle cradle 56. This bottle cradle 56 includes a bottle neck receiving and shoulder supporting rounded U yoke 58 supported by spaced apart flaring wires 60 and 62 connecting to the front corners of the rectangular foot 40, and is further supported by suspending spaced wires 64 and 66 which extend outwardly from the upper corners of the inverted squared U rear wire as at 68 and 70 and then inclined downwardly and then flared inwardly at 72 and 74 and are secured to the yoke 58 whereupon when the bottle 14 is placed in inclined inverted position thereon, the inclined wires 64 and 66 would embrace opposite sides of the bottle and the flared portions 72 and 74 embrace the shoulder 22 of the bottle which rests on the yoke 18 with the neck extending therethrough.

Extending forwardly from the sides 46 and 48 of the rectangular foot wire 40 are stabilizing toe wires 76 and 78 which help to insure that the bottle 14 in its stand 10 will not tend to tip over forwardly.

In operation, when the bottle of milk or other beverage is received at the home, the bottle cap will be removed the tap 16 inserted into the shank of the neck 20 and the bottle 14 will be placed on the stand 10 adjacent the forward end of the refrigerator 12 within the refrigerator. As thus supported, the beverage or milk can be dispensed therefrom at any time as above described and as illustrated in Fig. 1.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

A stand for supporting a liquid dispensing bottle in inverted inclined position, the bottle having a neck of substantially smaller diameter than the body of the bottle, and a shoulder connecting the neck to the body; said stand comprising a supporting foot portion in a common plane arranged to rest on a supporting surface, an upright portion extending from the rear of said foot portion, and an inclined bottle cradle portion supported at its upper end by said upright portion and at its lower end by said foot portion forwardly of said rear upright portion, said cradle portion including a yoke open at its top through which the bottle neck may pass to rest on the bottle shoulder, said cradle also including spaced apart supporting standards extending from said foot portion and spaced apart suspending standards extending from said rear upright portion, said rear upright portion being arranged to support the dispensing bottle below its inverted bottom with the center of gravity of the bottle projected within said foot portion at all times, said spaced apart suspending portions being arranged to embrace opposite sides of the dispensing bottle as far as its shoulder with the shoulder resting on said yoke, said stand comprising integrally united metal wire, said foot portion comprising a four-sided rectangular wire and an integral stabilizing toe wire extending forwardly from the two opposite sides thereof, said upright portion including a pair of upright wires extending up from the rear ends of said opposite side wires of said foot rectangular wire, and a cross wire connecting the top ends of said upright pair and providing the rear support for the bottle, said yoke comprising a rounded U of wire, said spaced apart supporting standards comprising wires secured to said yoke and to said foot rectangular wire, and said suspending standards comprising wires secured to and flaring out from said yoke and then extending upwardly and rearwardly at an incline to a high point and then downwardly at an incline and secured to said rear upright wires.

References Cited in the file of this patent

UNITED STATES PATENTS

| | | |
|---|---|---|
| 1,649,852 | Patterson | Nov. 22, 1927 |
| 2,211,227 | Feindel | Aug. 13, 1940 |

FOREIGN PATENTS

| | | |
|---|---|---|
| 24,881 | Great Britain | Nov. 16, 1904 |
| 992,466 | France | July 11, 1951 |
| 1,023,616 | France | Dec. 30, 1952 |